(12) United States Patent
Yu et al.

(10) Patent No.: US 9,733,930 B2
(45) Date of Patent: Aug. 15, 2017

(54) LOGICAL LEVEL DIFFERENCE DETECTION BETWEEN SOFTWARE REVISIONS

(71) Applicant: SuccessFactors, Inc., South San Francisco, CA (US)

(72) Inventors: Grace Yu, Shanghai (CN); Yang Peng, Shanghai (CN); Andy Wu, Shanghai (CN); Jieyan Huang, Pudong New District (CN)

(73) Assignee: SuccessFactors, Inc., South San Francisco, CA (US)

( * ) Notice: Subject to any disclaimer, the term of this patent is extended or adjusted under 35 U.S.C. 154(b) by 0 days.

(21) Appl. No.: 14/976,551

(22) Filed: Dec. 21, 2015

(65) Prior Publication Data

US 2017/0177330 A1 Jun. 22, 2017

(51) Int. Cl.
*G06F 9/44* (2006.01)

(52) U.S. Cl.
CPC ........................................ *G06F 8/71* (2013.01)

(58) Field of Classification Search
CPC .............................................................. G06F 8/71
USPC .................................. 717/120–124, 140–146
See application file for complete search history.

(56) References Cited

U.S. PATENT DOCUMENTS

| | | | | |
|---|---|---|---|---|
| 5,500,881 A * | 3/1996 | Levin | ........................ | G06F 8/71 717/114 |
| 6,305,009 B1 * | 10/2001 | Goor | ........................ | G06F 8/47 717/116 |
| 6,691,303 B2 * | 2/2004 | Guthrie | ................. | G06F 8/4442 711/E12.011 |
| 7,080,357 B2 * | 7/2006 | Foster | ................. | G06F 11/3688 707/999.101 |
| 7,197,417 B2 * | 3/2007 | Pramanick | ......... | G01R 31/3183 702/108 |
| 7,685,579 B2 * | 3/2010 | Knowles | ............. | G06F 9/45533 717/136 |
| 7,720,662 B1 * | 5/2010 | Aldrich | ............... | G06F 11/3692 345/589 |
| 7,813,831 B2 * | 10/2010 | McCoy | ................... | G06F 9/545 700/198 |
| 7,895,566 B2 * | 2/2011 | Shenfield | ................. | G06F 8/20 717/106 |
| 7,975,256 B2 * | 7/2011 | Atkin | ...................... | G06F 8/443 717/122 |
| 8,201,026 B1 * | 6/2012 | Bornstein | ........... | G06F 9/45508 714/45 |
| 8,276,121 B2 * | 9/2012 | Miller | ....................... | G06F 8/71 717/120 |

(Continued)

OTHER PUBLICATIONS

Conradi et al, "Version Models for Software Configuration Management" ACM Computing Surveys, vol. 30, No. 2, pp, 232-282, 1998.*

(Continued)

*Primary Examiner* — Anil Khatri
(74) *Attorney, Agent, or Firm* — Schwegman Lundberg & Woessner, P.A.

(57) ABSTRACT

A comparison system includes a memory including a first compiled version and a second compiled version of a target application, at least one processor, and a comparison engine, executing on the at least one processor. The comparison engine is configured to identify a method in the first compiled version, locate the method in the second compiled version, compare the method in the first compiled version to the method in the second compiled version, and providing an indication that the method is an altered method from the first compiled version to the second compiled version of the target application.

17 Claims, 6 Drawing Sheets

(56) References Cited

U.S. PATENT DOCUMENTS

| | | | | |
|---|---|---|---|---|
| 8,464,228 B2* | 6/2013 | Campbell | ............... | G06F 8/36 |
| | | | | 717/140 |
| 8,554,732 B2* | 10/2013 | Clark | ............... | G06F 8/71 |
| | | | | 707/610 |
| 8,924,931 B2* | 12/2014 | Harding | ............... | G06F 8/71 |
| | | | | 717/121 |
| 9,069,644 B2* | 6/2015 | Melski | ............... | G06F 8/71 |
| 9,459,850 B2* | 10/2016 | Bates | ............... | G06F 9/4552 |

OTHER PUBLICATIONS

Kaur et al, "A Layered Structure for Uniform Version Management in Component Based Systems", ACM SIGSOFT Software Engineering Notes vol. 34 No. 6, pp. 1-7, 2009.*

Sloane,, "An Evaluation of an Automatically Generated Compiler", ACM Transactions on Programmmg Languages and Systems, vol. 17. No. 5, pp. 691-703,1995.*

Koukos et al, "Multiversioned Decoupled Access-Execute: The Key to Energy-Efficient Compilation of General-Purpose Programs", ACM, pp. 121-131, 2016.*

Fink et al, "Design, Implementation and Evaluation of Adaptive Recompilation with On-Stack Replacement", IEEE, pp. 241-252, 2003.*

Zhou et al, "Space-Efficient Multi-Versioning for Input-Adaptive Feedback-Driven Program Optimizations", ACM, pp. 763-776, 2014.*

Cheong et al, "Version Control Approach to Cache Coherence", ACM, pp. 322-330, 1989.*

Serpette et al, "Compiling Scheme to JVM bytecode: a performance study", ACM, pp. 259-270, 2002.*

* cited by examiner

LOGICAL LEVEL DIFFERENCE DETECTION BETWEEN SOFTWARE REVISIONS

TECHNICAL FIELD

This document relates generally to software development, and more particularly in one example embodiment, to a software analysis system for comparing revisions of software.

BACKGROUND

In the field of computer software and, more particularly, software development and programming, application programmers write applications in a source language such as Java® or C++. During the course of development, an application may go through several iterations or revisions. At each revision, changes may have been made to various components of the application. Tracking these changes between revisions may be problematic for developers. In some situations, the developers may wish to know where, in the source code, changes were made between revisions.

SUMMARY

In one embodiment, a comparison system is provided. The comparison system includes a memory including a first compiled version and a second compiled version of a target application. The comparison system also includes at least one hardware processor. The comparison system further includes a comparison engine executing on the at least one hardware processor. The comparison engine is configured to access the memory and identify a method in the first compiled version. The comparison engine is also configured to locate the method in the second compiled version. The comparison engine is further configured to compare, using the at least one processor, the method in the first compiled version to the method in the second compiled version. The comparison engine is also configured to provide an indication that the method is changed from the first compiled version to the second compiled version of the target application.

In another embodiment, a computerized method is provided. The method includes identifying, in a memory, a method in a first compiled version of a target application. The method also includes locating, in the memory, the method in a second compiled version of the target application. The method further includes comparing, by at least one processor, the method in the first compiled version to the method in the second compiled version. The method also includes causing display of an indication that the method is changed from the first compiled version to the second compiled version of the target application.

In yet another embodiment, a non-transitory machine-readable medium storing processor-executable instructions is provided. The instructions, when executed by a processor, cause the processor to identify a method in a first compiled version of a target application. The instructions also cause the processor to locate the method in a second compiled version of the target application. The instructions further cause the processor to compare the method in the first compiled version to the method in the second compiled version. The instructions also cause the processor to cause display of an indication that the method is changed from the first compiled version to the second compiled version of the target application.

The above methods, apparatus, and computer program products may, in some implementations, further include one or more of the following features.

The comparison engine may also be configured to compare a structure of the method in the first compiled version to a structure of the method in the second compiled version. The comparison engine may also be configured to generate a first structure signature based on the structure of the method in the first compiled version. The comparison engine may also be configured to generate a second structure signature based on the structure of the method in the second compiled version. Comparing the structure of the method in the first compiled version to the structure of the method in the second compiled version may include comparing the first structure signature to the second structure signature.

The comparison engine may also be configured to compare operations in the method in the first compiled version to operations in the method in the second compiled version. The comparison engine may also be configured to generate a first operations signature based on the operations in the method in the first compiled version. The comparison engine may also be configured to generate a second operations signature based on the operations in the method in the second compiled version. Comparing the operations in the method in the first compiled version to the operations in the method in the second compiled version may include comparing the first operations signature to the second operations signature.

The comparison system may also include a compiler. The comparison engine may also be configured to initiate compilation of one of a first source code and a second source code of the target application using the compiler, thereby generating one of the first compiled version and the second compiled version. The memory may also include a source database storing one of the first compiled version and the second compiled version. The comparison engine may also be configured to retrieve the one of the first compiled version and the second compiled version from the source database prior to the comparing.

The method may also include comparing a structure of the method in the first compiled version to a structure of the method in the second compiled version. The method may also include generating a first structure signature based on the structure of the method in the first compiled version. The method may also include generating a second structure signature based on the structure of the method in the second compiled version. Comparing the structure of the method in the first compiled version to the structure of the method in the second compiled version may include comparing the first structure signature to the second structure signature. Comparing the method in the first compiled version to the method in the second compiled version further may include comparing operations in the method in the first compiled version to operations in the method in the second compiled version.

The method may also include generating a first operations signature based on the operations in the method in the first compiled version. The method may also include generating a second operations signature based on the operations in the method in the second compiled version. Comparing the operations in the method in the first compiled version to the operations in the method in the second compiled version may include comparing the first operations signature to the second operations signature. The method may also include initiating compilation of one of a first source code and a second source code of the target application using a compiler, thereby generating one of the first compiled version and the second compiled version. The method may also include retrieving the one of the first compiled version and the second compiled version from a source database prior to the comparing.

The instructions may also cause the processor to compare a structure of the method in the first compiled version to a structure of the method in the second compiled version. The instructions may also cause the processor to generate a first structure signature based on the structure of the method in the first compiled version. The instructions may also cause the processor to generate a second structure signature based on the structure of the method in the second compiled version. Comparing the structure of the method in the first compiled version to the structure of the method in the second compiled version includes comparing the first structure signature to the second structure signature.

The instructions may also cause the processor to generate a first operations signature based on the operations in the method in the first compiled version. The instructions may also cause the processor to generate a second operations signature based on the operations in the method in the second compiled version. The instructions may also cause the processor to compare the first operations signature to the second operations signature. The instructions may also cause the processor to initiate compilation of one of a first source code and a second source code of the target application using a compiler, thereby generating one of the first compiled version and the second compiled version. The instructions may also cause the processor to retrieve the one of the first compiled version and the second compiled version from the source database prior to the comparing.

BRIEF DESCRIPTION OF DRAWINGS

The present disclosure illustrates embodiments of the inventive subject matter by way of example and not limitation, and with reference to the following drawings, in which like numbers represent like components.

DETAILED DESCRIPTION

Figure 1:
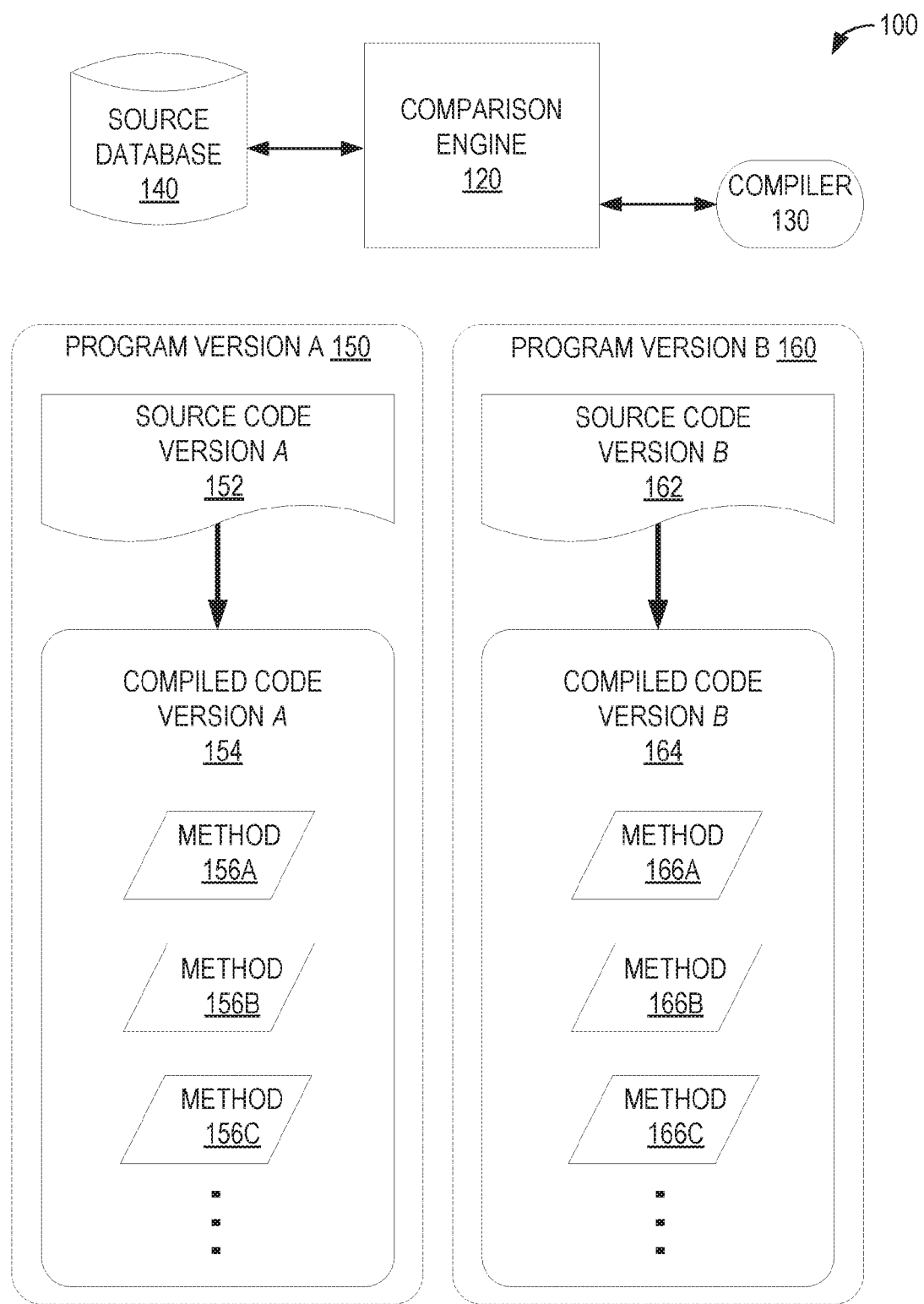
FIG. 1 is a block diagram illustrating a comparison system, in accordance with an example embodiment, that includes a comparison engine that compares versions of an application or "target program."

The description that follows includes example systems, methods, techniques, instruction sequences, and computing machine program products that embody illustrative embodiments of the disclosure. For the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Some comparison tools perform a line-by-line comparison of the lines of source code between two revisions and flag individual lines if there are any textual differences between a line in the first revision and an associated line in the second revision. Such comparisons may show which lines have changed from one version to the next, but are not able to distinguish and identify logical differences. For developers, it may be more useful to identify which methods or classes have changed. For example, developers may wish to know which Java® methods and/or classes have changed. This may help developers or quality assurance (QA) testers, for example, determine the root cause of defects introduced between versions.

These and other technical problems may be addressed by a comparison system described herein. The embodiments disclosed herein implement a comparison system and methods that enable software developers to compare two revisions of a software program or application (a "target application") to determine differences between the two revisions. The comparison system identifies differences at a logical level relative to the programming language (e.g., at a method level), rather than merely comparing bytes of source code text to determine which lines have changed. The comparison system thus is able to alert the developer as to which logical structures or blocks (e.g., Java® methods, functions, classes) within the source code have changed (e.g., been added to, deleted, or modified) from one version to the next.

To determine these logical differences and identify the altered structures, the comparison system operates on two versions of a target application, referred to herein as a "first version" and a "second version" for sake of simplicity. Each version includes corresponding source code (e.g., in one or more source code files). In the examples provided herein, the source code programming language is Java®, but it should be understood that this comparison system may perform these comparisons on applications written in any other programming language that enables the systems and methods described herein.

The comparison system converts the source code for both the first and second versions into Java® byte code (or "bytecode") (e.g., using a Java® compiler), thus generating a "first version bytecode" and a "second version bytecode". For example, a class file may get converted into bytecode by the Java® compiler. These bytecode versions each contain a bytecode stream for each method in the class. As such, the comparison system compares each method existing in either or both of the first and second version bytecodes (e.g., one method at a time).

To compare each method, the comparison system generates two comparison constructs for each version of the method from the respective bytecode versions. First, the comparison system generates a "structure signature" for each version of the method. The structure of the method, in the bytecode, includes attributes of the method that define the structure of the method ("structure attributes"), such as an access flag, a return type, a method name, the number of arguments for the method, and argument type(s) of the arguments for the method. The comparison system combines these values and generates a method signature, or "structure signature", for the combination of those values. Next, the comparison system generates an "operations signature" for each version of the method as well. The operations of the method are included in the bytecode, and include one or more operations which would be performed upon execution of the method. The comparison system performs a hash on all of the instructions of the method, thereby generating the operations signature for each version of the method.

The comparison system generates structure signatures and operations signatures for each version of each method in the target application (e.g., the class file, or multiple files included in the application). Once generated, the comparison system identifies each individual method present in the target application, identifies the structure and operations signatures for each version of the method, and compares the structure and operations signatures to determine if there are differences in the method between versions. The comparison system may indicate differences in the structure of the method between versions (e.g., additional arguments, or a change in type). The comparison system may indicate differences in the operations of the method between versions (e.g., though the structure may be the same, the operations within the method may have changed).

FIG. 1 is a block diagram illustrating a comparison system 100, in accordance with an example embodiment, that includes a comparison engine 120 that compares versions of an application or "target program". The comparison engine 120 is implemented on a computing device (not separately shown on FIG. 1), and is in communication with or otherwise has access to a target programming language compiler (or just "compiler") 130 and optionally a source database 140. The source database 140 may be a source code control system in which application developers store applications and, more particularly, versions of applications during the lifecycle of software development. The target language, in the example embodiment, is Java®, and thus the compiler 130 is a Java® compiler that performs conversion of Java® source code into Java® byte code, an intermediate code interpretable by a Java® Virtual Machine. The examples provided herein are described in relation to Java®. However, it should be understood that the systems and methods described herein may be performed with other source code languages, compilers, interpreters, and virtual machines. For example, these systems and methods may be performed by other languages that provide a virtual machine layer.

In the example shown in FIG. 1, the comparison engine 120 operates on two versions of the target program, for example, which may be under development, and thus may undergo changes or revisions between versions. The target program includes program version A 150 and program version B 160, where version A 150 is an earlier version of the target program, and version B 160 is a later version of the same target program. In other words, there may be one or more changes, additions, or deletions made (e.g., by the developers) between version A 150 and version B 160. The versions 150, 160 may, but need not be, consecutive versions.

Version A 150 includes source code version A 152, which includes one or more components of source code, such as Java® class files. Similarly, version B 160 includes source code version B 162, which includes similar components of source code, each of which may be associated with source code version A 152 (e.g., later versions of the source code). In the example embodiment, FIG. 1 depicts a single Java® source code file as source code version A 152 and a later source code version B 162 of the same file (e.g., "TestClass.class").

Each of the program versions 150, 160 also include associated compiled versions, compiled code version A 154 and compiled code version B 164, respectively. In other words, compiled code version A 154 is the resultant compiled version of the source code version A 152, and similarly, compiled code version B 154 is the compiled version of the source code version B 162. In the example embodiment, because the target programming language is Java®, the compiled versions 154, 164 are Java® byte code, an intermediate code interpretable by a Java® virtual machine at execution time. Further, the comparison engine 120 may invoke the compiler 130 to compile one or more of source code versions 152, 162 during comparison of the program versions 150, 160. In some embodiments, one or more of the source code versions 152, 162 may be pre-compiled (e.g., compiled code versions 154, 164 may be pre-existing, and stored in the source database 140).

The comparison engine 120 performs comparison operations at a logical level, for example, by function, or class, or method. Each program version 150, 160 includes one or more programming blocks (e.g., Java® methods), logical building blocks from which modern programming languages group sets of operations. In the example embodiment, program version A 150 includes methods 156A, 156B, and 156C, and program version B 160 includes methods 166A, 166B, and 166C, each of which may or may not have an associated method in the other version. Example source code, compiled code, and associated methods are provided below in respect to FIG. 2.

Components of program versions 150, 160 (e.g., source code versions 152, 162, or compiled code versions 154, 164) may be stored in the source database 140, and may be accessed by the comparison engine 120 or identified by a programmer during operation. Further, while only a single source code file is shown in FIG. 1 (e.g., with two associated versions 152, 162), it should be understood that the systems and methods described herein may operate on target programs having multiple source code files, compiled versions, and/or greater or fewer methods.

Figure 2:
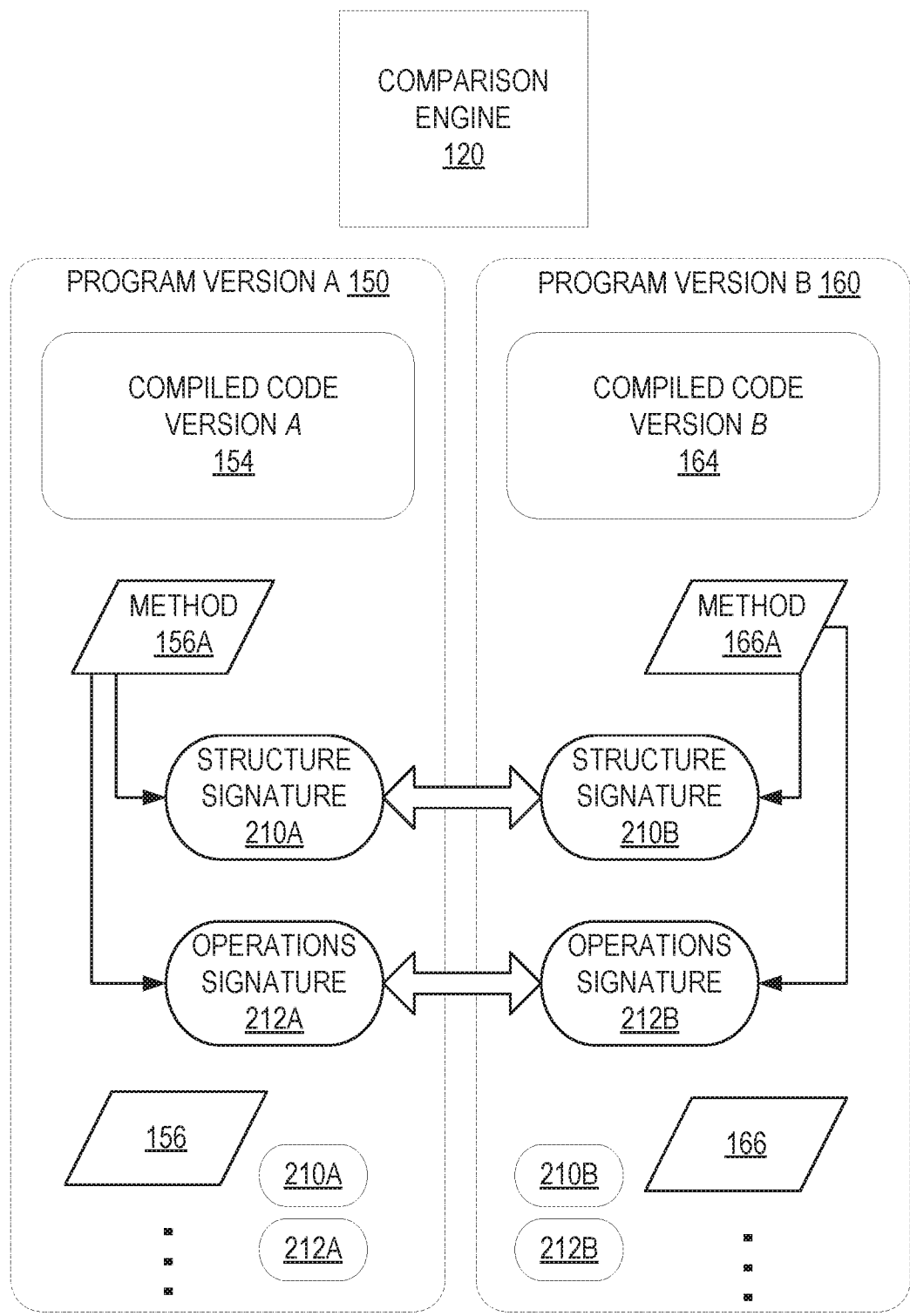
FIG. 2 is a block diagram illustrating operation of the comparison engine during analysis of the two program versions.

FIG. 2 is a block diagram illustrating operation of the comparison engine 120 during analysis of the two program versions 150, 160. FIG. 2 shows the compiled versions 154, 164 of program version A 150 and version B 160. In the example embodiment, program version A 150 and version B 160 each include multiple methods 156 and 166, respectively. In other words, the source code version A 152 and version B 162 each contain source code for the methods 156, 166, and the compiled versions 154, 164 each also include sections of compiled code for methods 156, 166, as illustrated in FIG. 2.

The comparison engine 120 compares program versions 150 and 160 based on the compiled versions of the methods 156, 166. More specifically, for each method 156, 166 of the compiled versions 154, 164, the comparison engine 120 generates a structure signature 210 and an operations signature 212. For example, the comparison engine 120 generates a structure signature 210A and an operations signature 212A for method 156A, as well as a structure signature 210B and an operations signature 212B for the associated method 166A. The structure signatures 210 are constructed from elements or attributes of the programming block definitions for the associated method 156, 166 (e.g., the class or method definitions). The operations signatures 212 are constructed from the operations within the programming blocks (e.g., the operations that are executed when the method 156, 166 is called during runtime). The comparison engine 120 then compares the programming blocks (e.g., associated methods 156A, 166A) by comparing the structure signatures 210 and operations signatures 212 of the associated pairs of programming blocks. Generation of the structure signatures 210 and operations signatures 212 are described in greater detail below.

By way of example, consider the following source code written in the Java® programming language, which may be source code version A 152:

```
// Source Code - Version A
public class TestClass {
    public int increment(int n) {
        return n+1;
    }
    public int addtogether(int m, int n) {
        return m+n;
    }
}
```

Source code version A 152 includes three programming blocks, a class definition named "TestClass", and two methods defined within that class, "increment" and "addtogether". The purpose of the "increment" method is to add one to the inputted value, n, returning the value "n+1". The purpose of the "addtogether" method is to add two inputted values, in and a, together, returning the value "m+n".

Further, in this example, the source code version B 162 has been modified, perhaps erroneously, to reflect the following:

```
// Source Code - Version B
public class TestClass {
    public int inc(int n) {
        return n+1;
    }
    public int addtogether(int m, int n) {
        return m;
    }
}
```

For purposes of example, source code version B 162 includes two changes to note. The first is a change to the name of the first method. The method name in version A 152 was "increment", but that method was changed in version B 162 to be named "inc". The second is a change to the return value in the method "addtogether". The method "addtogether", in version A 152, returned the value "m±n", where in version B 162, the method "addtogether" merely returns the value "m".

As mentioned above, the comparison engine 120 may compile the Java® source code (e.g., version A 152 and version B 162) into the compiled version A 154 and compiled version B 164 (e.g., using a Java® compiler, such as the compiler 130). The compiled versions 154, 164, for this example, are in byte code. For example, compiled version A 154 may be:

```
// Byte code - Version A
public class com.sf.APITestUtil.TestClass {
public TestClass( );
    0 aload_0 [this]
    1 invokespecial java.lang.Object( ) [8]
    4 return
```

```
Line numbers:
    [pc: 0, line: 3]
Local variable table:
    [pc: 0, pc: 5] local: this index: 0 type:
        com.sf.APITestUtil.TestClass
// Method descriptor #15 (I)I
// Stack: 2, Locals: 2
public int increment(int n);
    0 iload_1 [n]
    1 iconst_1
    2 iadd
    3 ireturn
    Line numbers:
        [pc: 0, line: 5]
    Local variable table:
        [pc: 0, pc: 4] local: this index: 0 type:
            com.sf.APITestUtil.TestClass
        [pc: 0, pc: 4] local: n index: 1 type: int
// Method descriptor #1 9 (II)I
// Stack: 2, Locals: 3
public int addtogether(int m, int n);
0 iload_1 [m]
1 iload_2 [n]
2 iadd
3 ireturn
Line numbers:
    [pc: 0, line: 8]
Local variable table:
    [pc: 0, pc: 4] local: this index: 0 type: com.sf.APITestUtil.TestClass
    [pc: 0, pc: 4] local: m index: 1 type: int
    [pc: 0, pc: 4] local: n index: 2 type: int
}
```

Similarly, compiled version B 164 may be:

```
// Byte code - Version B
public class com.sf.APITestUtil.TestClass {
public TestClass( );
    0 aload_0 [this]
    1 invokespecial java.lang.Object( ) [8]
    4 return
    Line numbers:
        [pc: 0, line: 3]
    Local variable table:
        [pc: 0, pc: 5] local: this index: 0 type:
            com.sf.APITestUtil.TestClass
// Method descriptor #15 (I)I
// Stack: 2, Locals: 2
public int inc(int n);
    0 iload_1 [n]
    1 iconst_1
    2 iadd
    3 ireturn
    Line numbers:
        [pc: 0, line: 5]
    Local variable table:
        [pc: 0, pc: 4] local:
            this index: 0 type: com.sf.APITestUtil.TestClass
        [pc: 0, pc: 4] local: n index: 1 type: int.
// Method descriptor #19 (II)I
// Stack: 2, Locals: 3
public int addtogether(int m, int n);
0 iload_1 [m]
1 ireturn
Line numbers:
    [pc: 0, line: 8]
Local variable table:
    [pc: 0, pc: 4] local: this index: 0 type: com.sf.APITestUtil.TestClass
    [pc: 0, pc: 4] local: m index: 1 type: int
    [pc: 0, pc: 4] local: n index: 2 type: int
}
```

In this example, there are three program blocks, or methods 156, for program version A 150, and three corresponding program blocks, or methods 166, for program version B 160. The comparison engine 120 identifies each of these methods 156, 166 by analyzing the compiled version A 154 and compiled version B 164 shown above. More specifically, the comparison engine 120 parses the compiled versions 154, 164 and identifies each of the methods 156, 166 based on the Java® class file, which contains the definition of the Java® class or interface (as a standardized structure, e.g., "methods_count" and "method_info").

For each method 156 that is identified, the comparison engine 120 generates a corresponding structure signature 210A and operations signature 212A. Similarly, for each method 166 that is identified, the comparison engine 120 generates a corresponding structure signature 210B and operations signature 212B.

The comparison engine 120 generates structure signatures 210 based on one or more structure attributes of the program block or method 156, 166. Some example structure attributes include an access flag, a return type, a method name, the number of arguments for the method 156, 166, and argument names and argument type(s) of the arguments for the method 156, 166. For example, the example compiled version A 154 byte code above defines a method "increment" which has an a method name of "increment", an access flag of "public", a return type of "int", a number of arguments of one, and an argument called "n" having a type "int".

To generate the structure signatures 210 for a particular method 156, 166, the comparison engine 120 combines one or more of the structure attributes of that method 156, 166 and then generates a method signature, or type signature, of the combined attributes. The method signature includes the function's return type, the number of arguments, the types of arguments, and/or errors it may pass back. For example, for the example method "increment", the comparison engine 120 may perform string concatenation on the structure attributes of the method name, the access flag, the return type, the number of arguments, the argument name(s), and the argument types to generate a byte array such as: "incrementpublicint001nint". The comparison engine 120 then generates a message digest (e.g., structure signature 210A, as an MD5 digest) from this combined attributes string.

When the comparison engine 120 compares two related methods (e.g., method 156A and its associated counterpart in compiled version B 164, method 166A), the comparison engine 120 compares the method signatures of each counterpart method (e.g., structure signature 210A and 210B, the resultant values from the method digests). Due to the nature of generating method signatures, as well as how the structure attributes string is generated, if any of the attributes of the method 156, 166 change from compiled version A 154 to compiled version B 164, the resultant structure signatures 210A, 210B of the two methods 156A and 166A will be different. Thus, the comparison engine 120 may identify that method 156A, 166A as changing between program version A 150 and program version B 160 based on alterations in the method structures.

In other embodiments, the comparison engine 120 may compare the structure attributes of the associated methods 156, 166 without a message digest. For example, the comparison engine 120 may concatenate the structure attributes of the method 156 into the structure signature 210A, and similarly concatenate the structure attributes of the method 166 into the structure signature 210B. During comparison, the structure signatures 210A and 210B may be compared. This alternative to message digests avoids the creation of the message digests (e.g., avoids some computations), but the byte lengths of the structure signatures 210A and 210B would be more varied, possibly quite long, and thus more difficult to anticipate for storage requirements (e.g., database column lengths). Message digests, on the other hand, have a fixed length.

To generate the operations signatures 212 for a particular method 156, 166, the comparison engine 120 combines the operations defined by the method and then generates a message digest of the operations. The comparison engine 120 may generate an array that includes each of the operations defined by the method 156, 166. For the example method "increment", the comparison engine 120 may generate an array that includes the operations of method 156A: "iload_1", "[n]", "iconst_1", "iadd", "ireturn". From this array, the comparison engine 120 generates a message digest using, for example, MessageDigest.getInstance("MD5"), thereby creating a message digest of the contents of each of the operations of the method 156A.

In other embodiments, the comparison engine 120 may compare the operations attributes of the associated methods 156, 166 without a message digest. For example, the comparison engine 120 may string compare all of the operations of the method 156 (e.g., the bytecode operations) to all of the operations of the method 166. In other words, the bytecode operations are used as the operations signatures 212A, 212B (e.g., unaltered). This alternative to message digests avoids the creation of the message digests (e.g., avoids some computations), but the byte lengths of the operations signatures 212A and 212B would be more varied, possibly quite long, and thus more difficult to anticipate for storage requirements (e.g., database column lengths). Message digests, on the other hand, have a fixed length.

When the comparison engine 120 compares two related methods (e.g., method 156A and its associated counterpart in compiled version B 154, method 166A), the comparison engine 120 may also compare the operations signatures 212 of each counterpart method (e.g., operations signature 212A and 212B, the resultant message digests of the respective sets of operations). Due to the nature of generating message digests of the operations, if any of the operations of the method change from compiled version A 154 to compiled version B 164, the resultant operations signatures 212A, 212B of the two methods 156A and 166A will be different. Thus, the comparison engine 120 may identify that method 156A, 166A as changing between program version A 150 and program version B 160 based on alterations in the operations.

In the example embodiment, the comparison engine 120 processes all of the methods 156 of compiled version A 154, computes the structure signatures 210A and operations signatures 212A of each of those methods 156, and then processes the compiled version B 164, computing the structure signatures 210B and operations signatures 212B of those methods 166. The comparison engine 120 stores all of the structure signatures 210A for the methods 156 of the compiled version A 154 in a first array of structure signatures, and all of the operations signatures 212A in a first array of operations signatures, where the n-th element in the array corresponds to the n-th program block or method 156. Similarly, comparison engine 120 stores the structure signatures 210B for the methods 166 of the compiled version B 164 in a second array of structure signatures, and all of the operations signatures 212B in a second array of operations signatures, where the n-th element in the array corresponds to the n-th program block or method 166.

Figure 3:
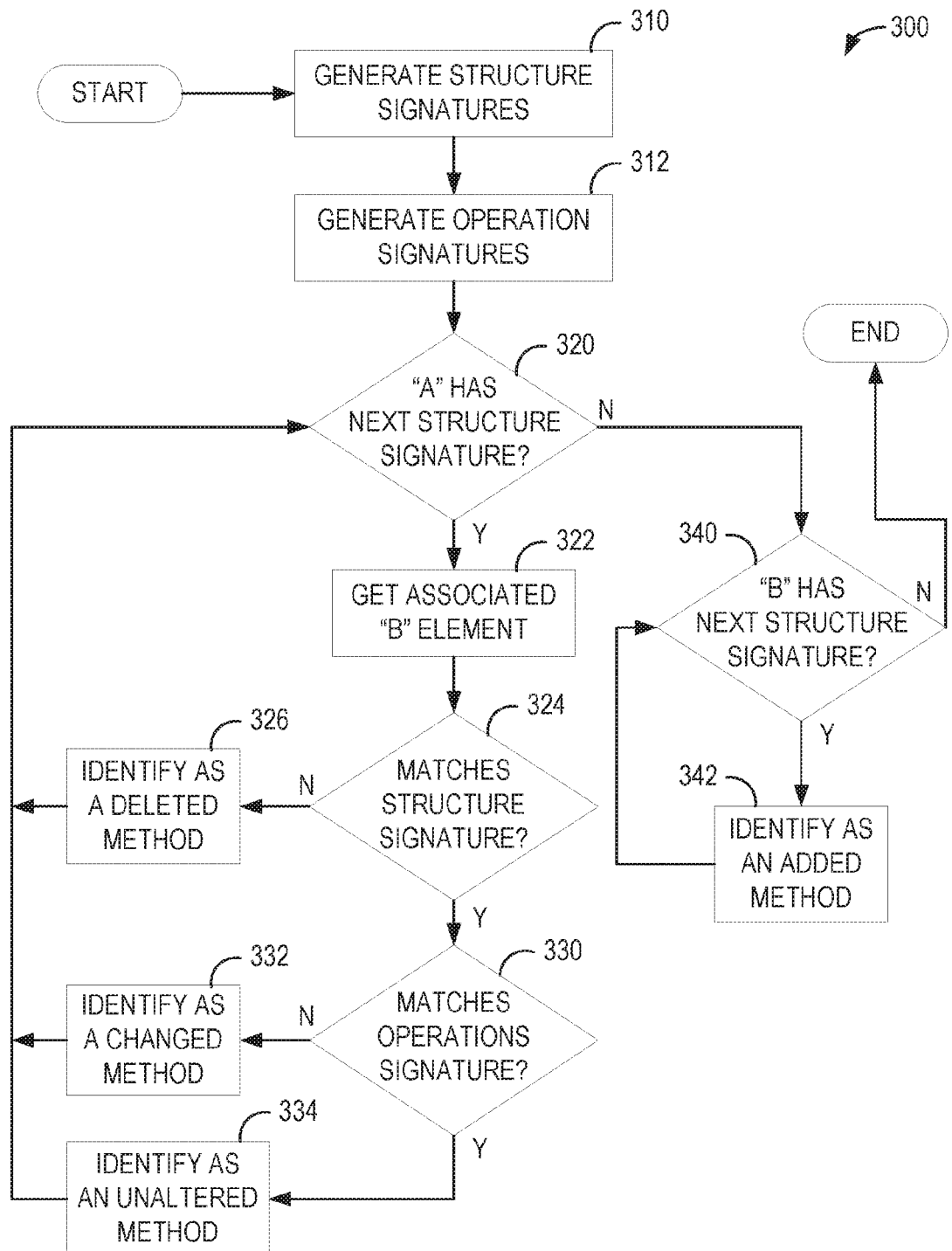
FIG. 3 is a flow chart of an example method for comparing two versions of a program or application, such as program version A and program version B shown in FIGS. 1 and 2.

FIG. 3 is a flow chart of an example method 300 for comparing two versions of a program or application, such as program version A 150 and program version B 160 shown in FIGS. 1 and 2. In some embodiments, the method 300 may be performed by the comparison engine 120, and may use the compiler 130 and/or the source database 140. At operation 310, the comparison engine 120 generates structure signatures 210 for program version A 150 and program version B 160 from their respective compiled versions 154, 164. The structure signatures 210 may be stored in two arrays of structure signatures ("SS"), one array for each of the program versions 150, 160 (e.g., "SSarray_A" and "SSarray_B"). At operation 312, the comparison engine 120 generates operation signatures 212 for program version A 150 and program version B 160 from their respective compiled versions 154, 164. The operations signatures 212 may be stored in two arrays of operations signatures"), one array for each of the program versions 150, 160 (e.g., "OSarray_A" and "OSarray_B").

Beginning at operation 320, the comparison engine 120 loops through each of the methods of compiled version A 154. More specifically, at operation 320, the comparison engine 120 checks to see if there is a remaining, unprocessed structure signature 210 for compiled version A 154 (e.g., in SSarray_A). If so, proceeds to compare that method to the corresponding method of the compiled version B 164 (e.g., the corresponding element of SSarray_B), if one exists. More specifically, at operation 322, the comparison engine 120 identifies the corresponding method within the SSarray_B.

At operation 324, the comparison engine 120 compares the SSarray_A element of the current method to the identified SSarray_B element. If a corresponding SSarray_B element was not found, or if the SSarray_A element does not match the SSarray_B element, then the method under examination is identified as a deleted method at operation 326.

At operation 330, the comparison engine 120 identifies the operations signature 212A for the current method being examined (e.g., the OSarray_A element) and the operations signature 212B of the associated method identified at operation 322 (e.g., the OSarray_B element) and compares these two operations signatures 212A, 212B together. If the OSarray_A element does not match the OSarray_B element, then this method is identified as a changed method at operation 332. If they do match, then this method is identified as unaltered at operation 334. Once the current method of compiled version A 154 has been evaluated (e.g., disposition determined at operations 326, 332, or 334), the comparison engine 120 loops to operation 320, looking for the next method in the SSarray_A until each method in that array has been processed.

Once there are no unprocessed methods (e.g., no remaining unprocessed structure signatures 210 for compiled version A 154 in the SSarray_A), then the comparison engine 120 proceeds to examine any unprocessed methods in compiled version B 164 (e.g., in SSarray_B). Because all of the methods in SSarray_A have been processed, each remaining unprocessed method in SSarray_B, at this stage, is flagged as an added method. At operation 340, the comparison engine 120 checks to see if there are any remaining, unprocessed methods in the SSarray_array. At operation 342, the comparison engine 120 identifies the unprocessed method in compiled version B 164 as an added method.

Figure 4:
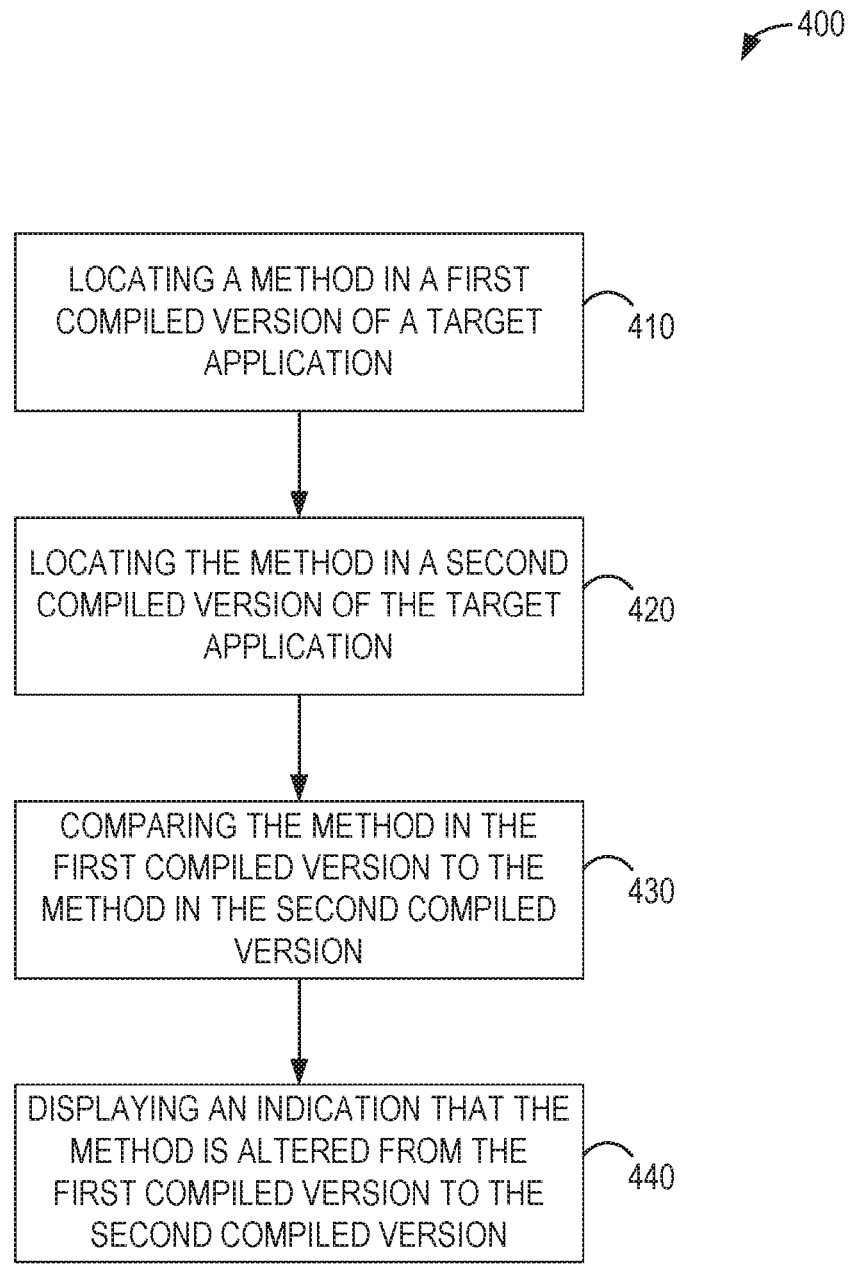
FIG. 4 illustrates a computerized method, in accordance with an example embodiment, for comparing two versions of a program or target application, such as program version A and program version B shown in FIG. 1.

FIG. 4 illustrates a computerized method 400, in accordance with an example embodiment, for comparing two versions of a program or target application, such as program version A 150 and program version B 160 shown in FIG. 1. The computerized method 400 is performed by a computing device comprising at least one processor and a memory. In the example embodiment, the computerized method 400 includes identifying, in the memory, a method in a first compiled version of a target application (see operation 410), and locating, in the memory, the method in a second compiled version of the target application (see operation 420).

At operation 430, the computerized method 400 includes comparing, by at least one processor, the method in the first compiled version to the method in the second compiled version. In some embodiments, comparing the method in the first compiled version to the method in the second compiled version further includes comparing a structure of the method in the first compiled version to a structure of the method in the second compiled version. Further, the computerized method 400 may include generating a first structure signature 210A based on the structure of the method in the first compiled version, and generating a second structure signature 210B based on the structure of the method in the second compiled version, wherein comparing the structure of the method in the first compiled version to the structure of the method in the second compiled version includes comparing the first structure signature 210A to the second structure signature 210B. In some embodiments, comparing the method in the first compiled version to the method in the second compiled version further includes comparing operations in the method in the first compiled version to operations in the method in the second compiled version. Further, the computerized method 400 may include generating a first operations signature 212A based on the operations in the method in the first compiled version, and generating a second operations signature 212B based on the operations in the method in the second compiled version, wherein comparing the operations in the method in the first compiled version to the operations in the method in the second compiled version includes comparing the first operations signature 212A to the second operations signature 212B.

In some embodiments, the computerized method 400 also includes initiating compilation of one of a first source code and a second source code of the target application using a compiler 130, thereby generating one of the first compiled version and the second compiled version. In some embodiments, the computerized method 400 includes retrieving the one of the first compiled version and the second compiled version from a source database prior 140 to the comparing. The computerized method 400 includes displaying to a user an indication that the method is changed from the first compiled version to the second compiled version of the target application (see operation 440).

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 5:
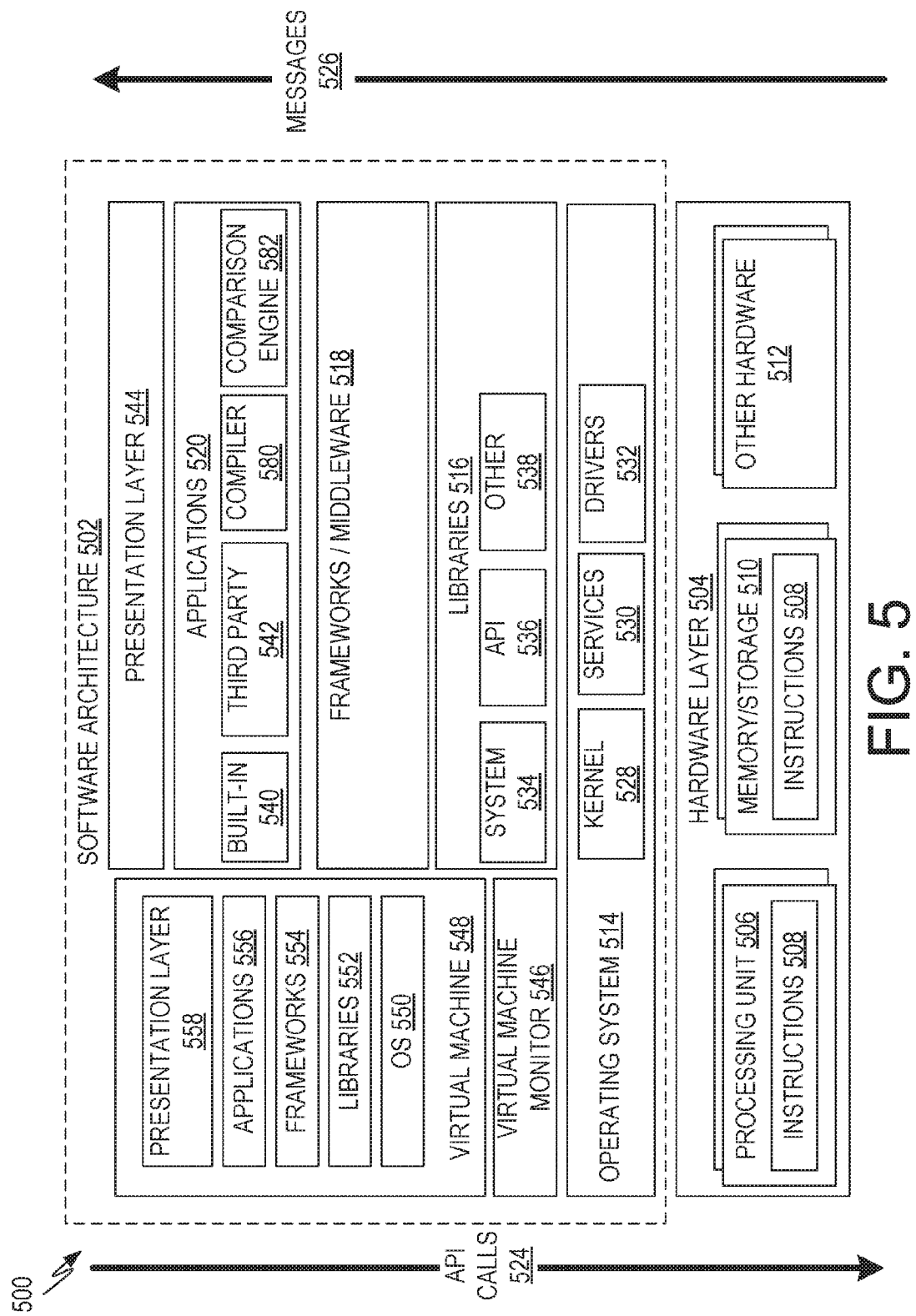
FIG. 5 is a block diagram illustrating an example software architecture, which may be used in conjunction with various hardware architectures herein described, to perform comparison of two versions of a target application, such as program version A and program version B shown in FIGS. 1 and 2.

FIG. 5 is a block diagram 500 illustrating an example software architecture 502, which may be used in conjunction with various hardware architectures herein described, to perform comparison of two versions of a target application, such as program version A 150 and program version B 160 shown in FIGS. 1 and 2. A comparison engine 582 may be similar to the comparison engine 120, and a compiler 580 may be similar to the compiler 130, each of which are shown in an application layer 520, but may be provided in whole or in part at other layers shown in FIG. 5. FIG. 5 is a non-limiting example of a software architecture 502 and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 having associated executable instructions 508. The executable instructions 508 represent the executable instructions of the software architecture 502, including implementation of the methods, modules and so forth described herein. The hardware layer 504 also includes memory/storage 510, which also includes the executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks or middleware 518, applications 520 and a presentation layer 544. Operationally, the applications 520 and/or other components within the layers may invoke application programming interface (API) calls 524 through the software stack and receive a response as messages 526. The layers illustrated are representative in nature and not all software architectures 502 have all layers. For example, some mobile or special purpose operating systems 514 may not provide the frameworks/middleware 518, while others may provide such a layer. Other software architectures 502 may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers e.g., Universal Serial Bus (USB) drivers), Wi-Fi® drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) provide a higher-level common infrastructure that may be used by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system 514 or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any an application developed using the Android™ or iOS™ software development kit (SDK) by an entity other than the vendor of the particular platform, and may be mobile software running on a mobile operating system 514 such as iOS™, Android™, Windows® Phone, or other mobile operating systems 514. The third-party applications 542 may invoke the API calls 524 provided by the mobile operating system such as operating system 514 to facilitate functionality described herein.

The applications 520 may use built-in operating system functions (e.g., kernel 528, services 530 and/or drivers 532), libraries 516, or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures 502 use virtual machines. In the example of FIG. 5, this is illustrated by a virtual machine 548. The virtual machine 548 creates a software environment where applications/modules can execute as if they were executing on a hardware machine (such as the machine 600 of FIG. 11, for example). The virtual machine 548 is hosted by a host operating system (e.g., operating system 514) and typically, although not always, has a virtual machine monitor 546, which manages the operation of the virtual machine 548 as well as the interface with the host operating system (i.e., operating system 514). A software architecture executes within the virtual machine 548 such as an operating system (OS) 550, libraries 552, frameworks 554, applications 556, and/or a presentation layer 558. These layers of software architecture executing within the virtual machine 548 can be the same as corresponding layers previously described or may be different.

Figure 6:
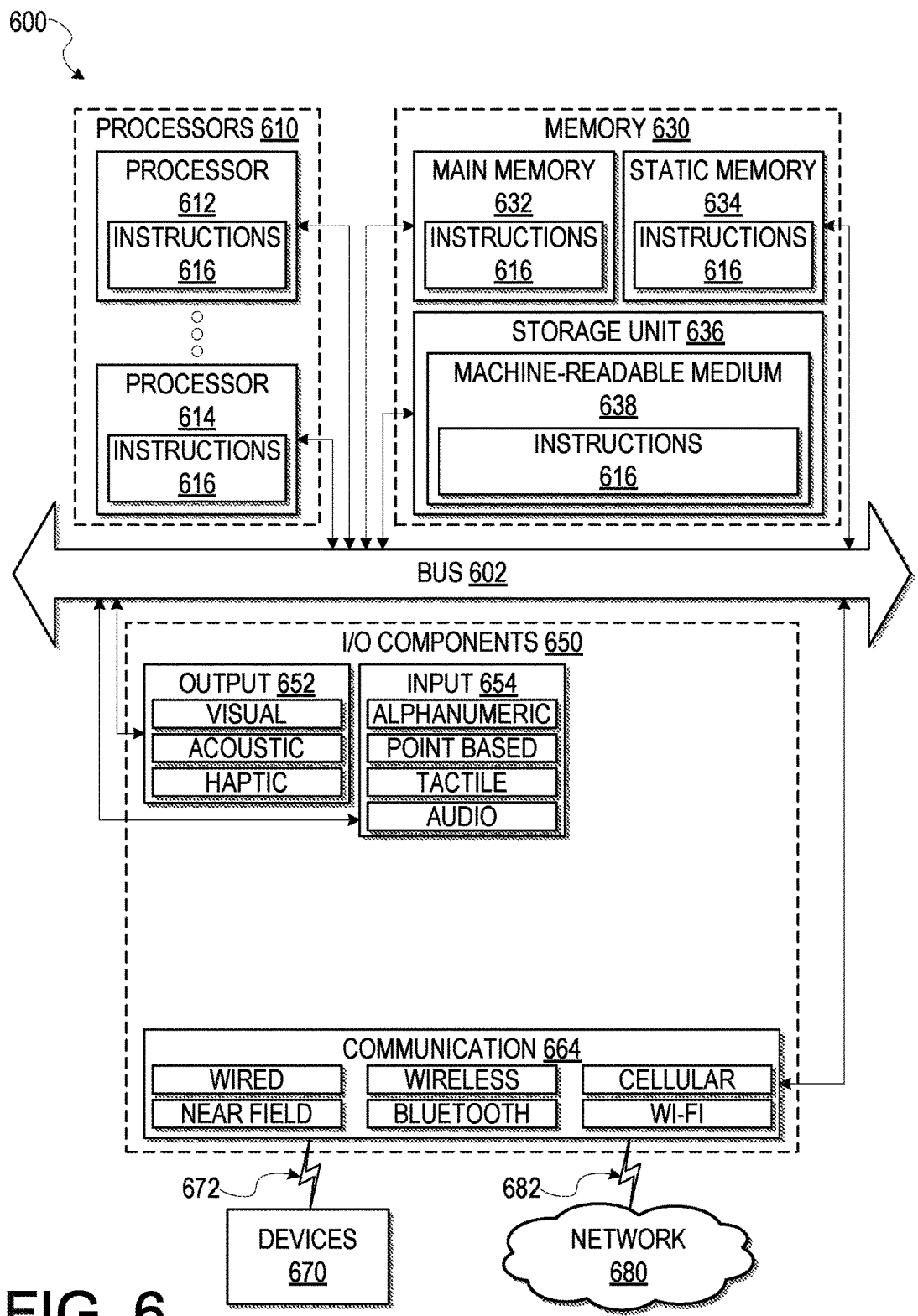
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 600, according to some example embodiments, configured to read instructions 616 from a machine-readable medium 638 (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an apple, an app, or other executable code) for causing the machine 600 to perform any one or more of the methodologies discussed herein may be executed. As such, the instructions 616 may be used to implement modules or components described herein. The instructions 616 transform the general, non-programmed machine 600 into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), a cellular telephone, a smart phone, a mobile device, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 612 and a processor 614 that may execute the instructions

616. The term "processor" is intended to include a multi-core processor 612 that may comprise two or more independent processors 612, 614 (sometimes referred to as "cores") that may execute instructions 616 contemporaneously. Although FIG. 6 shows multiple processors 612, 614, the machine 600 may include a single processor 612 with a single core, a single processor 612 with multiple cores (e.g., a multi-core processor), multiple processors 612, 614 with a single core, multiple processors 612, 614 with multiples cores, or any combination thereof.

The memory/storage 630 may include a memory, such as a main memory 632, a static memory 634, or other memory, and a storage unit 636, both accessible to the processors 610 such as via the bus 602. The storage unit 636 and memory 632, 634 store the instructions 616 embodying any one or more of the methodologies or functions described herein. The instructions 616 may also reside, completely or partially, within the memory 632, 634, within the storage unit 636, within at least one of the processors 610 (e.g., within the processor's cache memory), or any suitable combination thereof, during execution thereof by the machine 600. Accordingly, the memory 632, 634, the storage unit 636, and the memory of processors 610 are examples of machine-readable media 638.

As used herein, "machine-readable medium" means a device able to store instructions 616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 650 may include a wide variety of components to receive input, provide output, produce output, transmit information, exchange information, capture measurements, and so on. The specific input/output (I/O) components 650 that are included in a particular machine 600 will depend on the type of machine. For example, portable machines 600 such as mobile phones will likely include a touch input device or other such input mechanisms, while a headless server machine 600 will likely not include such a touch input device. It will be appreciated that the input/output (I/O) components 650 may include many other components that are not shown in FIG. 6. The input/output (I/O) components 650 are grouped according to functionality merely for simplifying the following discussion and the grouping is in no way limiting. In various example embodiments, the input/output (I/O) components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The input/output (I/O) components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine 600 or any of a wide variety of peripheral devices (e.g., a peripheral device coupled via a Universal Serial Bus (USB)).

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A comparison system comprising:
a memory storing a first compiled version and a second compiled version of a target application;
one or more hardware processors; and
a comparison engine comprising instructions that, when executed on at least one of the one or more hardware processors, cause the comparison engine to perform operations comprising:
accessing the memory and identifying a method in the first compiled version;
locating the method in the second compiled version;
comparing the method in the first compiled version to the method in the second compiled version to determine whether the method in the first compiled version is different from the method in the second compiled version,
the comparing of the method in the first compiled version to the method in the second compiled version comprising comparing a structure of the method in the first compiled version to a structure of the method in the second compiled version; and
based on a determination that the method in the first compiled version is different from the method in the second compiled version, causing display of an indication that the method is changed from the first compiled version to the second compiled version of the target application.

2. The comparison system of claim 1, wherein the operations further comprise:
generating a first structure signature based on the structure of the method in the first compiled version; and
generating a second structure signature based on the structure of the method in the second compiled version,
wherein comparing the structure of the method in the first compiled version to the structure of the method in the second compiled version comprises comparing the first structure signature to the second structure signature.

3. The comparison system of claim 1, wherein comparing the method in the first compiled version to the method in the second compiled version further comprises comparing operations in the method in the first compiled version to operations in the method in the second compiled version.

4. The comparison system of claim 3, wherein the operations further comprise:
generating a first operations signature based on the operations in the method in the first compiled version; and
generating a second operations signature based on the operations in the method in the second compiled version,
wherein comparing the operations in the method in the first compiled version to the operations in the method in the second compiled version comprises comparing the first operations signature to the second operations signature.

5. The comparison system of claim 1, further comprising:
a compiler,
wherein the operations further comprise initiating compilation of at least one of a first source code and a second source code of the target application using the compiler, thereby generating at least one of the first compiled version and the second compiled version.

6. The comparison system of claim 1, wherein the memory further stores a source database storing at least one of the first compiled version and the second compiled version; and
wherein the operations further comprising comprise retrieving the at least one of the first compiled version and the second compiled version from the source database prior to the comparing of the method in the first compiled version to the method in the second compiled version.

7. A computerized method comprising:
identifying, in a memory, a method in a first compiled version of a target application;
locating, in the memory, the method in a second compiled version of the target application;
comparing, by at least one hardware processor, the method in the first compiled version to the method in the second compiled version to determine whether the method in the first compiled version is different from the method in the second compiled version,
the comparing of the method in the first compiled version to the method in the second compiled version comprising comparing a structure of the method in the first compiled version to a structure of the method in the second compiled version; and
based on a determination that the method in the first compiled version is different from the method in the second compiled version, causing display of an indication that the method is changed from the first compiled version to the second compiled version of the target application.

8. The computerized method of claim 7, further comprising:
generating a first structure signature based on the structure of the method in the first compiled version; and
generating a second structure signature based on the structure of the method in the second compiled version,
wherein comparing the structure of the method in the first compiled version to the structure of the method in the second compiled version comprises comparing the first structure signature to the second structure signature.

9. The computerized method of claim 7, wherein comparing the method in the first compiled version to the method in the second compiled version comprises comparing operations in the method in the first compiled version to operations in the method in the second compiled version.

10. The computerized method of claim 9, further comprising:
generating a first operations signature based on the operations in the method in the first compiled version; and
generating a second operations signature based on the operations in the method in the second compiled version,
wherein comparing the operations in the method in the first compiled version to the operations in the method in the second compiled version comprises comparing the first operations signature to the second operations signature.

11. The computerized method of claim 7, further comprising initiating compilation of at least one of a first source code and a second source code of the target application using a compiler, thereby generating at least one of the first compiled version and the second compiled version.

12. The computerized method of claim 7, further comprising retrieving at least one of the first compiled version and the second compiled version from a source database prior to the comparing of the method in the first compiled version to the method in the second compiled version.

13. A non-transitory machine-readable medium storing processor-executable instructions that, when executed by at least one hardware processor of a machine, cause the machine to perform operations comprising:
   identifying a method in a first compiled version of a target application;
   locate locating the method in a second compiled version of the target application;
   comparing the method in the first compiled version to the method in the second compiled version to determine whether the method in the first compiled version is different from the method in the second compiled version,
   the comparing of the method in the first compiled version to the method in the second compiled version comprising comparing a structure of the method in the first compiled version to a structure of the method in the second compiled version; and
   based on a determination that the method in the first compiled version is different from the method in the second compiled version, causing display of an indication that the method is changed from the first compiled version to the second compiled version of the target application.

14. The machine-readable medium of claim 13, wherein the operations further comprise:
   generating a first structure signature based on the structure of the method in the first compiled version; and
   generating a second structure signature based on the structure of the method in the second compiled version,
   wherein comparing the structure of the method in the first compiled version to the structure of the method in the second compiled version comprises comparing the first structure signature to the second structure signature.

15. The machine-readable medium of claim 13, wherein the operations further comprise:
   generating a first operations signature based on operations in the method in the first compiled version;
   generating a second operations signature based on operations in the method in the second compiled version
   wherein comparing the method in the first compiled version to the method in the second compiled version comprises comparing the first operations signature to the second operations signature to determine whether the operations of the method in the first compiled version are different from the operations of the method in the second compiled version.

16. The machine-readable medium of claim 13, wherein the operations further comprise:
   initiating compilation of at least one of a first source code and a second source code of the target application using a compiler, thereby generating at least one of the first compiled version and the second compiled version.

17. The machine-readable medium of claim 13, wherein the operations further comprise:
   retrieving at least one of the first compiled version and the second compiled version from the source database prior to the comparing of the method in the first compiled version to the method in the second compiled version.

\* \* \* \* \*